(12) United States Patent
Kappler

(10) Patent No.: US 12,229,129 B1
(45) Date of Patent: Feb. 18, 2025

(54) DATABASE MANAGEMENT OF HOUSEHOLDING DATA USING GROUP SURROGATE KEYS

(71) Applicant: Wells Fargo Bank, N.A., San Francisco, CA (US)

(72) Inventor: Jonathan R. Kappler, Hamel, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/476,021

(22) Filed: Sep. 27, 2023

(51) Int. Cl.
*G06F 16/2453* (2019.01)
*G06F 16/2458* (2019.01)

(52) U.S. Cl.
CPC .... *G06F 16/24537* (2019.01); *G06F 16/2468* (2019.01)

(58) Field of Classification Search
CPC ........................ G06F 16/24537; G06F 16/2468
See application file for complete search history.

(56) References Cited

U.S. PATENT DOCUMENTS

| | | | |
|---|---|---|---|
| 8,064,586 B2 | 11/2011 | Shaffer et al. | |
| 8,996,033 B1 | 3/2015 | Xu et al. | |
| 9,933,254 B2 | 4/2018 | Thornberry et al. | |
| 10,282,444 B2 * | 5/2019 | Bozkaya | G06F 16/243 |
| 11,232,475 B2 | 1/2022 | Tekiela et al. | |
| 11,526,472 B2 | 12/2022 | Craft | |
| 2007/0061190 A1 | 3/2007 | Wardell | |
| 2011/0035288 A1 | 2/2011 | Clyne | |
| 2016/0182657 A1 | 6/2016 | Mukherjee et al. | |
| 2021/0110343 A1 | 4/2021 | Lagneaux et al. | |

FOREIGN PATENT DOCUMENTS

WO 0068860 11/2000

OTHER PUBLICATIONS

Choi, Jason, "Predicting customer address changes using transaction behavior patterns", 2015 Systems and Information Engineering Design Symposium, Date of Conference: Apr. 24-24, 2015, INSPEC Accession No. 15202176, DOI: 10.1109 SIEDS.2015.7116988, (Apr. 24, 2015), 5 pgs.

\* cited by examiner

*Primary Examiner* — Baoquoc N To
(74) *Attorney, Agent, or Firm* — SCHWEGMAN LUNDBERG & WOESSNER, P.A.

(57) ABSTRACT

A method may include executing, using a processing unit, a data join operation between entries in a rehouseholding database table and a standardized address database table to generate a rehousehold address table, the rehousehold address table including a first set of address columns; accessing an address database table including a second set of address columns; executing fuzzy match search between entries in the rehousehold address table and entries in the address database table using values in the first set of address columns and second set of address columns; receiving a match result from the executing; calculating a quality score for the match result; determining score exceeds a quality match threshold; and in response, updating a household identifier value of an entry in an account cross-reference database table for an account identifier and address surrogate key associated with the match result.

20 Claims, 8 Drawing Sheets

DATABASE MANAGEMENT OF HOUSEHOLDING DATA USING GROUP SURROGATE KEYS

BACKGROUND

In the area of customer care management, one aspect that ensures smooth operations is accurate address information. Having a precise and accurate address for each customer is often vital for accurate delivery of communications with a customer. However, the traditional process of gathering and verifying this information, referred to as householding, presents a host of challenges. Inaccurate data, duplication, misidentification of addresses, and varied spellings, frequently lead to inefficiencies in the mailing process, affecting quick receipt of vital information, cost-effectiveness, and customer satisfaction.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
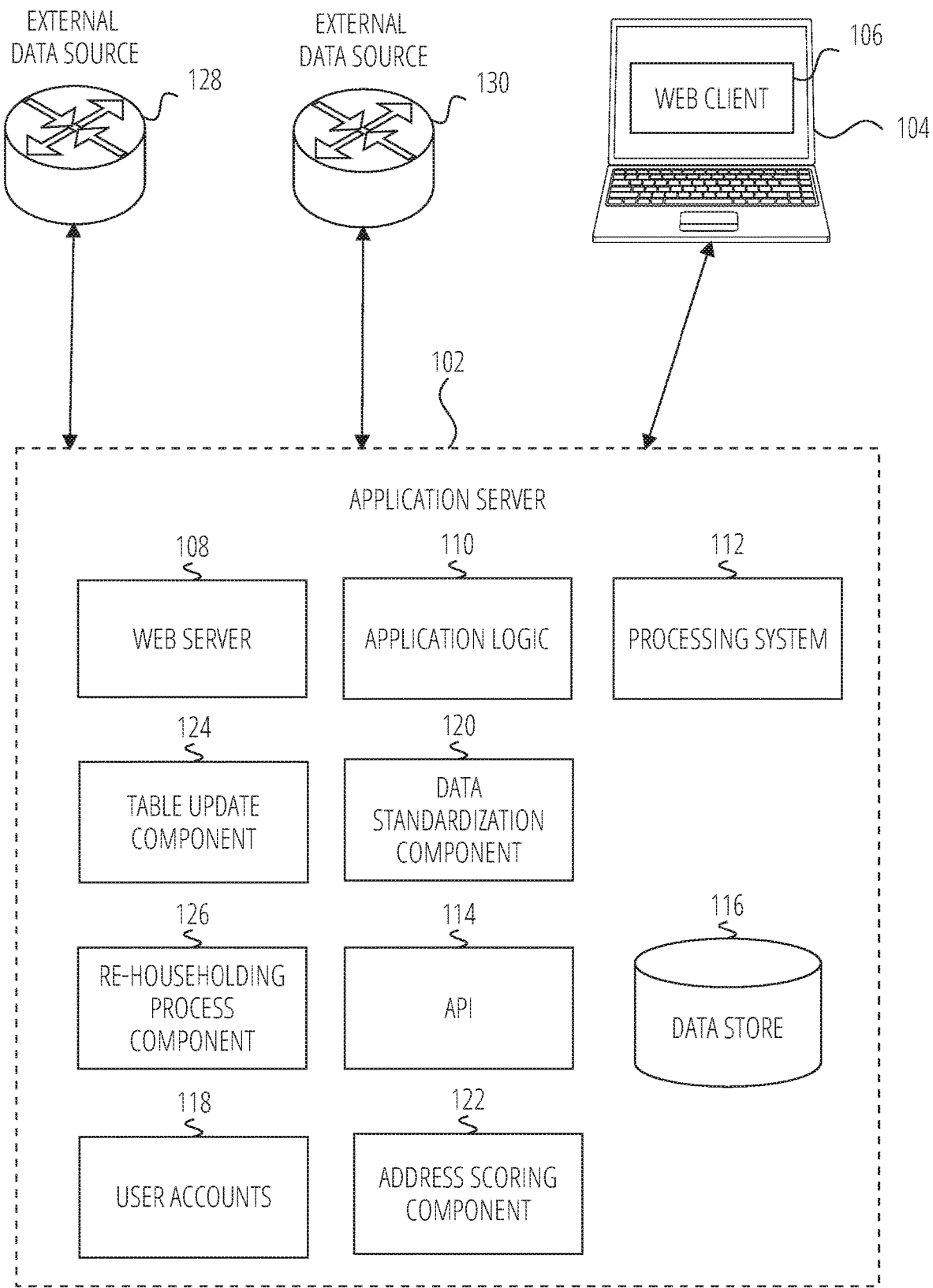
FIG. 1 is a schematic representation of an operating environment of an application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

Grouping people (e.g., into households) is a function of many businesses, as it allows a business to understand which accounts are associated with which address, how many customers are located at an address etc. This process is commonly referred to as householding. At the end of a householding a process, a user account is assigned to a single household identifier. Multiple user accounts (and customers) may be associated with a single household identifier. Each household identifier may be unique and associated with a physical location—e.g., longitude and latitude coordinates corresponding to a rooftop of the location.

One problem in the householding process is that addresses can have many inconsistencies and variations across different databases and inputs. Typos, misspellings, conflicting formatting, and outdated information are common issues. When addresses are the primary data element used to group people into households, any errors or variations in addresses can result in multiple household identifiers even though the addresses are actually the same physical location. Or in the worst case, the address is simply one that cannot be found, and no mail may be delivered to the user. As a result of these problems, for a given user it may not be clear which household identifier should be used. Furthermore, if the "same" address is represented multiple times due to address inconsistencies, it limits the quality of the data and may lead to communications not being sent to an invalid or incorrect address.

One solution to the data integrity problems is to group address variants and then select the "best" one as representative of the group. The grouping may be performed using a variety of logical comparisons and physical location cross-referencing (e.g., latitude and longitude coordinates). For example, "123 Main Street" may be grouped with "123 Main St." A household identifier may be associated (e.g., in a database table) with multiple address variants of the "same" address as best can be determined according to the logical comparisons.

This solution to the data integrity issue creates its own challenges when new or updated addresses are received. For example, a system (e.g., application server 102 as discussed with respect to FIG. 1) may receive a request from a user to update their address, an official government entity may transmit a message indicating a street has changed names, or a new user account is created with an identified address, etc. The received address may then need to be compared to each and every other address in the system to see which address grouping it should be part of.

However, while this may be feasible for smaller datasets, it quickly creates inefficiency and computing performance problems for large databases with tens of millions of address entries and potentially millions of addresses changes or update being received weekly. The ability of a system to efficiently process data of millions of address records, find errors, and group like addresses is a complex technical task. Constant or frequent householding processing of an entire database cannot practically be executed as it may take days and would tie up computing resources that would be unable to be used for other system operations.

In view of these problems, this disclosure details systems and methods to efficiently execute householding (or rehouseholding of existing accounts) for large databases. For example, described herein are data structures and data matching algorithms that use a tiered or "waterfall" approach where each step may increase in computational complexity. Consequently, many addresses received may be processed without requiring the full rehouseholding process. Additionally, the rehouseholding process itself results in more accurate address resolution thereby reducing errors in mailings, which may be important when sending sensitive documents such as financial statements.

FIG. 1 is a schematic representation of an operating environment of an application server, according to various examples. FIG. 1 illustrates an application server 102, a client device 104, a web client 106, a web server 108, an application logic 110, a processing system 112, an API 114, a data store 116, a user accounts 118, a data standardization component 120, a table update component 124, a re-householding process component 126, an address scoring component 122, an external data source 128, and an external data source 130.

Application server 102 is illustrated as set of separate elements (e.g., component, logic, etc.). However, the functionality of multiple, individual elements may be performed by a single element. An element may represent computer program code that is executable by processing system 112 (e.g., one such as computer system 700). The program code may be stored on a storage device (e.g., data store 116) and loaded into a memory of the processing system 112 for execution. Portions of the program code may be executed in a parallel across multiple processing units (e.g., a core of a general-purpose computer processor, a graphical processing unit, an application specific integrated circuit, etc.) of processing system 112. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. Client device 104 may be used, for example, by a user to transmit a change of address to application server 102. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104, application server 102, external data source 128, and external data source 130 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

External data sources 128 may be an official address data source such as the United States Postal Service. Periodically, there may be change to existing addresses such as when a street is renamed (or is converted from a rural route style address to a city street address), etc. Accordingly, application server 102 may receive data from external data source 128 with the new address information. External data source 130 may be a scoring service that provides a quality rating of a provided (e.g., over an application programming interface (API)), which may be used to sort multiple given addresses.

Other external data sources beyond external data source 128 and external data source 130 may also be used with application server 102. Furthermore, the data sets and processing of data by external data source 128 and external data source 130 may be performed by elements of application server 102, in various examples.

In various examples, communications between application server 102, client device 104, external data source 128, and external data source 130 may occur using an API provided by the external data sources or application server 102 (e.g., API 114). An API may provide a data exchange method for computing processes. A web-based API (e.g., API 114) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 116).

As an example, API 114 may include a network location endpoint (e.g., website/address/submit) that a website or service may use an HTTP POST request with an address in a JavaScript Object Notation (JSON) format. Similarly, external data source 130 may provide an endpoint that receives HTTP POST requests with the address in a JSON format and returns a JSON payload with a quality score metric (e.g., between 0 and 1).

Instead of, or in addition to web-based APIs, the elements in application server 102 may provide their own APIs to process data for other elements. For example, table update component 124 may incorporate a programming library of address scoring component 122 that takes an address data structure as input and returns a float variable between 0 and 1 representing address quality.

Application server 102 may include web server 108 to enable data exchanges with client device 104 via web client 106. Although generally discussed in the context of delivering webpages via the Hypertext Transfer Protocol (HTTP), other network protocols may be utilized by web server 108 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 108. In response, web server 108 may transmit a web page that is rendered on a display device of a client device (e.g., a mobile phone, desktop computer, etc.).

Additionally, web server 108 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 116) in various examples. For example, the web application may be a user profile account management interface where a user can update their address information.

The web application may be executed according to application logic 110. Application logic 110 may use the various elements of application server 102 to implement the web application. For example, application logic 110 may issue API calls to retrieve or store data from data store 116 and transmit it for display on client device 104. Similarly, data entered by a user into a UI component may be transmitted using API 114 back to the web server. Application logic 110 may use other elements (e.g., data standardization component 120, table update component 124, re-householding process component 126, etc.) of application server 102 to perform functionality associated with the web application as described further herein.

Data store 116 may store data that is used by application server 102. Data store 116 is depicted as singular element but may be multiple data stores. The specific storage layout and model used in by data store 116 may take several forms-indeed, a data store 116 may utilize multiple models. Data store 116 may be, but is not limited to, a relational database (e.g., SQL), non-relational database (NoSQL) a flat file database, object model, document details model, graph database, shared ledger (e.g., blockchain), or a file system hierarchy. Data store 116 may store data on one or more storage devices (e.g., a hard disk, random access memory (RAM), etc.). The storage devices may be in standalone arrays, part of one or more servers, and may be in one or more geographic areas.

For discussion purposes, data store 116 is described as a relational database with a set of tables. For example, there may be an address table, an account address cross-reference table, a customer address cross reference table, and a names table. Examples of partial data schemas for these three tables are presented in more detail as ADDRESSES table 232, ACCT_ADDR_XREF 302, CUST_ADDR_XREF 304, and NAMES table 230 respectively, in FIG. 3.

The functionality of data standardization component 120, table update component 124, re-householding process component 126, and address scoring component 122 are discussed in more detail with respect to the following figures, however, a brief overview is presented here first.

Data standardization component 120 may perform transformations on raw address data to clean and normalize it before further processing. For example, data standardization component 120 may shorten words to standard postal abbreviations like "Street" to "ST" or "Road" to "RD." The component may also perform data merging such as combining attributes from separate lines into a single field. The raw input may have the street number and name on one line with the city, state, and postal code on the next line. Combining these together enables better pattern matching (e.g., Integer:Alphabetic:StreetSuffix for 123 Main St.). Data standardization component 120 may verify formatting of state and province codes to ensure they match expected patterns. Additional standardization techniques include removing punctuation, case normalization (e.g., to all capitals), and handling common misspellings. Applying these types of transformations results in cleaner and more consistent input data for the grouping and scoring algorithms used in subsequent steps of the householding process.

Address scoring component 122 may take address data as input and output a quality score (e.g., zero to one where zero is low quality). For example, address scoring component 122 may format and transmit an API request to external data source 130 with the address as a data payload. External data source 130 may transmit back the quality rating back as a JSON message, which address scoring component 122 may parse to receive the quality score. In various examples, the scoring is performed on application server 102. A higher quality score may correspond to more exact matches between components of an address (e.g., street name, zip code, etc.) and an official address, such as one maintained by the United States Postal Service.

Table update component 124 may be used update the various database tables when new or updated addresses are received. For example, the update process of ADDRESSES table 232—described in more detail with respect to FIG. 4A—may create new address records and update the "best" address group for a group of address variants. Table update component 124 may also execute SQL commands to create, update, replaced or delete (CRUD operations) entries in other database tables as well.

Re-householding process component 126 may execute a series of operations to assign or update an account to a household identifier. The triggers for when a re-householding should be performed and the operations included for the re-householding are discussed in greater detail in FIG. 5.

User accounts 118 may include user profiles on users of application server 102. A user profile may include credential information such as a username and hash of a password. The profile may store address information associated with the accounts of the user.

Figure 2:
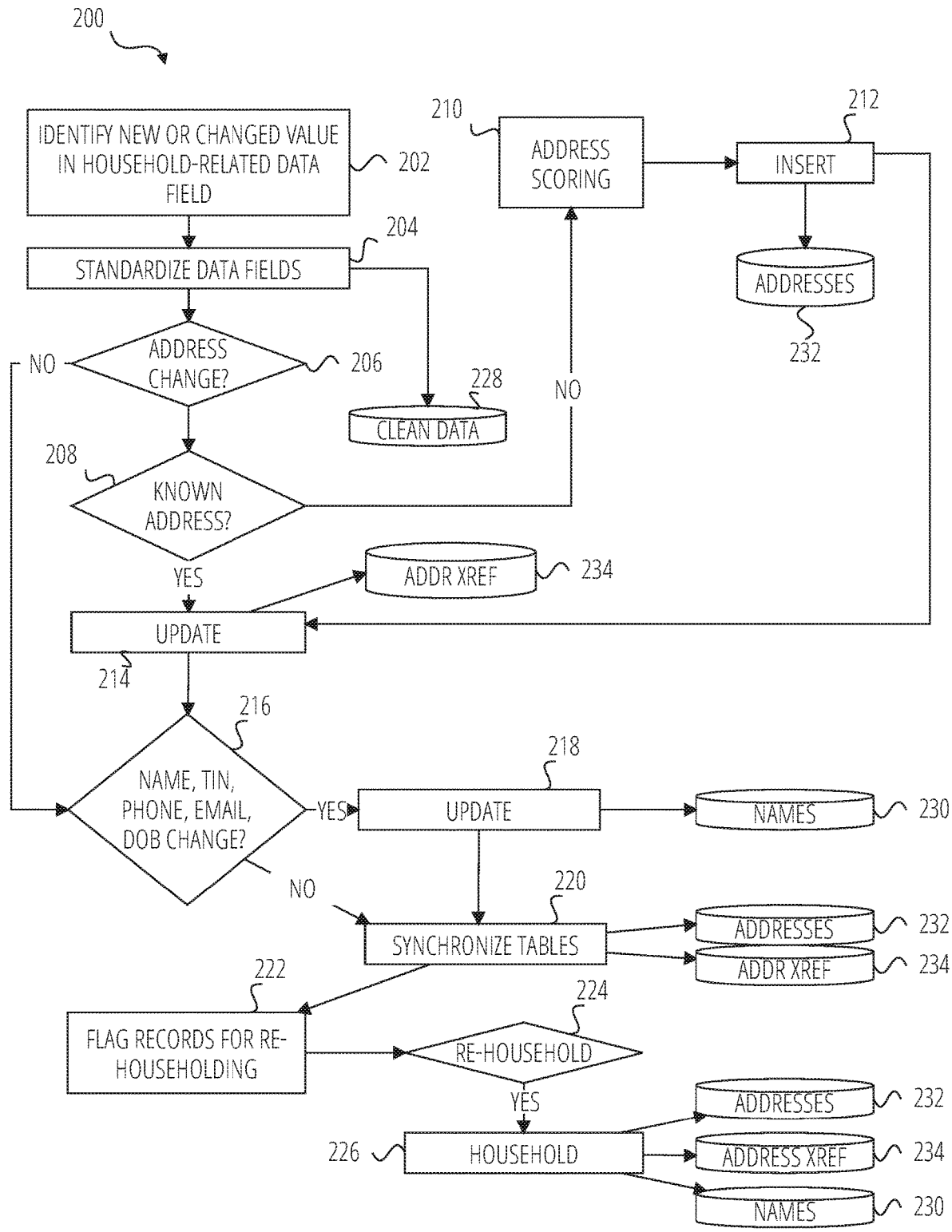
FIG. 2 is an overview flowchart illustrating method operations that may be performed when receiving a new or updated address, according to various examples.

FIG. 2 is an overview flowchart illustrating method 200 operations that may be performed when receiving new or updated customer contact information, according to various examples. The operations are presented in rectangle blocks. A diamond shape identifies a conditional operation branch, which depending on the evaluation of the condition, indicates which operation may occur next. The precise order and flow of the operations in method 200 are an example, and others may be used. In various examples, some of the operations may be performed in parallel. For discussion purposes method 200 is described as performed on application server 102.

It is common in regular parlance for a name to be part of address. However, in this disclosure a name may not be considered part of the address. Instead, the address may be the physical location. Accordingly, the address may be stored with latitude, longitude, address number, street name, city, state, and zip code fields. Household data fields may include name, date of birth, taxpayer identification number (TIN), phone number, and e-mail fields—in addition to the address data fields. In various examples, method 200 includes identifying new or changed household related data fields at trigger block 202 for a user account.

A customer account may have multiple accounts (e.g., a checking account, savings account, etc., referred to as user accounts), and there may be multiple customers on the same user account (e.g., a co-signer on a loan, dual accounts, business accounts, etc.). Additionally, customers may have different types of addresses such as a mailing address and residence address. Customers may use web applications provided by application server 102 to change an address or other household data field for an account, or a customer service representative may make the change on behalf of the customer.

The databases storing the household data may include, in some instances, hundreds of millions of different user accounts and customers' accounts. Depending on available computing resources, it may not be practical or cost effective to process all the accounts every time new or updated household related data comes into application server 102, as the process may take days to complete. Consequently, in various examples, method 200 may be performed monthly. To determine whether household data is new or changed for a user account, the household data that has come into the system in the past month (or other time period) may be iterated through and compared to previously ingested household data in the existing system of record (SOR) database (e.g., ADDRESSES table 232 and NAMES table 230). If no household data fields are new or changed for a user account, the process ends for that user account, and method 200 is performed on the next user account.

For each user account application server 102 determines is new or changed method 200 continues to standardize block 204 in which the household related data fields of the user account are standardized (e.g., by data standardization component 120). Standardization may include several operations. For example, one operation may apply punctuation, edits such as removing extra spaces or extraneous punctuation. Another may perform abbreviation translation or corrections such as Street to ST.; P O DRAWER to PO BOX; AVENU to AVE, etc.

Another standardization operation may include encoding words and word patterns for an address. For example, a code may be assigned to each type of "word" in an address: Integer numbers (N), street suffixes(S), directionals (D), hyphenated alphanumerics (-), banking terms (Z), initials (I), dates, etc. Then, a word address pattern(s) may be generated from word patterns. For example, the 3-word pattern "Integer:Alphabetic:StreetSuffix" would be a valid street address pattern and an address that matches such as "123 MAIN ST" could be coded as 'S3.' For multiline addresses, the word pattern may wrap between lines. After the word patters have been generated the address may be examined to find one of more of the defined word patterns and pick the "best" one (e.g., according to a stored ranking of word patterns).

Another operation of standardize block 204 may include attempted address obfuscation resolution. For example, 123MAINST may resolve to 123 MAIN ST or a rural style address such as "JT WROS 123 MAIN ST UAD 12/24/2009" may resolve to 123 MAIN ST. The de-obfuscation process may include breaking up an address into n-grams to find the individual components (e.g., number, street name) of an address or using regular expressions to find and convert errant or malformed address information, etc. The word pattern process may be repeated for the city and state information found in the address. The state/province code and country information may be verified and/or assigned if one is not provided (e.g., cross reference the city and street name with state address databases).

The operations of standardize block 204 may also include standardization of name patterns (e.g., first name, last name). This process may include looking for name patterns, recombining names split over multiple fields, split 'AND' names, avoid dates, banking terms, etc.

The standardized data may be stored in CLEAN DATA table 228. An entry in CLEAN DATA table 228 may be created that includes name, address, TIN, email, phone, and zip code fields. Because CLEAN DATA table 228 will not include household data fields on user accounts that have not changed it will be a smaller database than all the user account household data fields that may be received over the course of a month, for example. Consequently, processing of CLEAN DATA table 228 will be quicker and use less computing resources than operating all the user account data for customer accounts.

As indicated in the discussion of trigger block 202, there may have been either an address change or a non-address data field change to a user account. Accordingly, decision block 206 checks to see if the change was in one of the address fields. If not, method 200 continues to decision block 216. If yes, method 200 continues to address scoring operation 210.

Address scoring operation 210 may include generating or requesting (e.g., via an API) a score for a standardized address. Just because an address is standardized does not mean it exists as a physical location. Accordingly, address scoring component 122 of FIG. 1 may return a value (e.g., 0-1) indicating whether the address is "good." To make the process more efficient, a batch file of addresses may be processed by address scoring component 122 at once.

Address scoring component 122 may query a system of record of actual addresses that exist, such as determined by the United States Postal Service (USPS) and determine how many of the address fields match. For example, a score of '1' may be a complete match, '0.8' for 80% match and so forth. Other scoring methodologies may be used without departing from the scope of this disclosure. At insert operation block 212, the standardized address and its score may be added as an entry to ADDRESSES table 232. In various examples, if address scoring operation 210 returns a result that the address may not exist (e.g., below a certain score) it is not added to ADDRESSES table 232.

After insert operation block 212, method 200 performs update operation 214. Update operation 214 may also be performed if decision block 208 indicates the address was known. With respect to method 200, update operation 214 is for updating ADDR XREF table 234. XREF may mean cross-reference, in various examples. One cross reference entry in ADDR XREF table 234 may between an address and a user account. Another cross-reference may be a cross-reference between an address and a customer. The cross-reference may be made using primary keys from other database (e.g., a primary key in an address table to a primary key in a customer table). An example database schema of ADDR XREF table 234 is presented and discussed in more detail in FIG. 3.

After update operation 214, or if decision block 206 results in a "no", flow continues to decision block 216 to determine if the data standardized data includes a change to a non-address household data field (e.g., name, TIN, phone, etc.). Decision block 206 may be based on examining values for prior non-address household data fields for a user account as discussed above. If decision block 216 evaluates to "yes" update operation 218 may be performed with respect to NAMES table 230. Updating may include changing an entry in NAMES table 230 to reflect the changed value (e.g., an updated phone number, etc.) Although address fields are the primary matching criteria for accounts, data in NAMES table 230 may be used to supplement the match when the address data may be questionable as part of a fuzzy match thereby leading to increased confidence that a match is.

Figure 3:
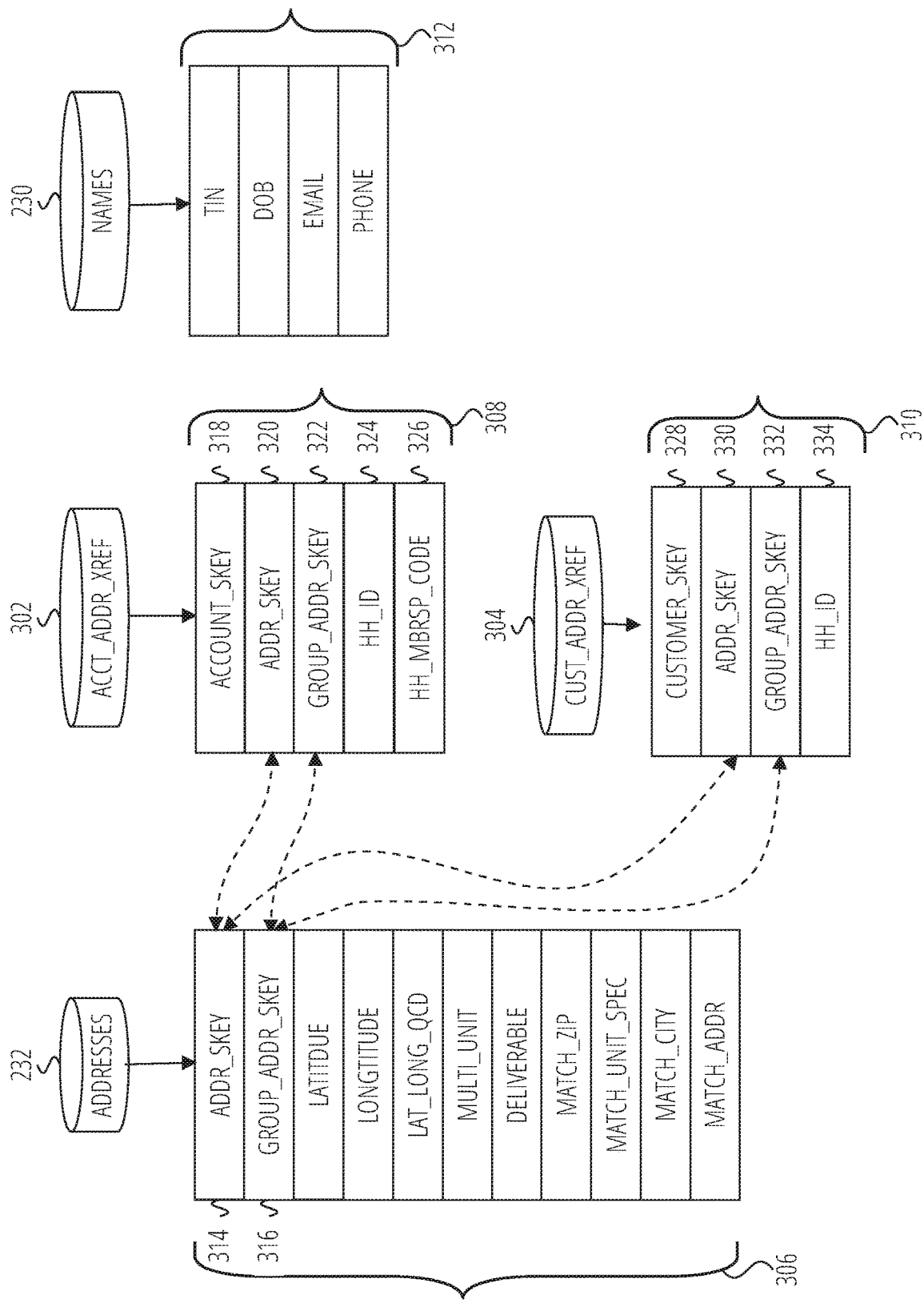
FIG. 3 illustrates database table schemas, according to various examples.
Figure 4A:
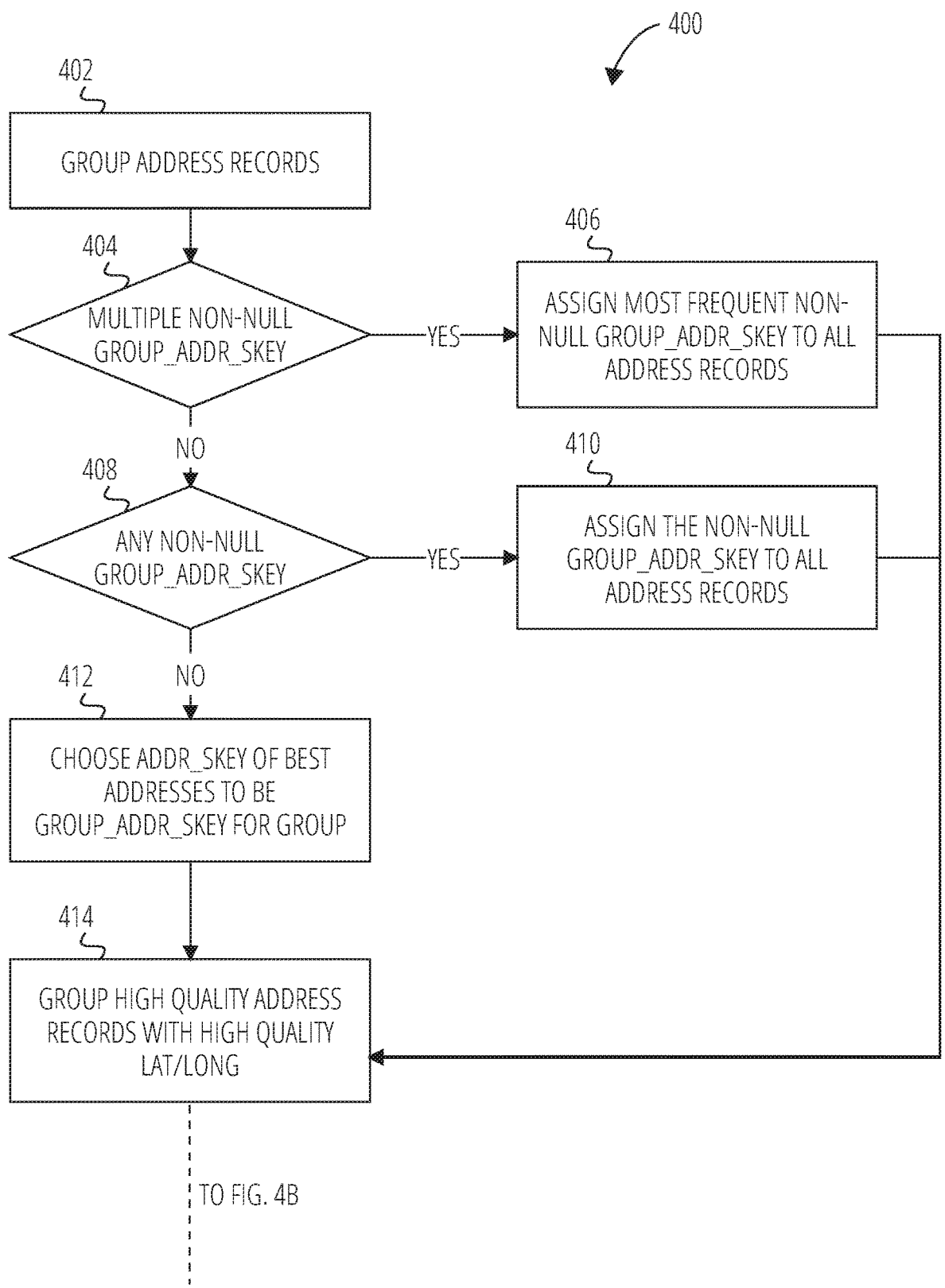
FIG. 4A is flowchart figure identifying operations of a method that groups addresses and assigns group address surrogate keys, according to various examples.
Figure 5:
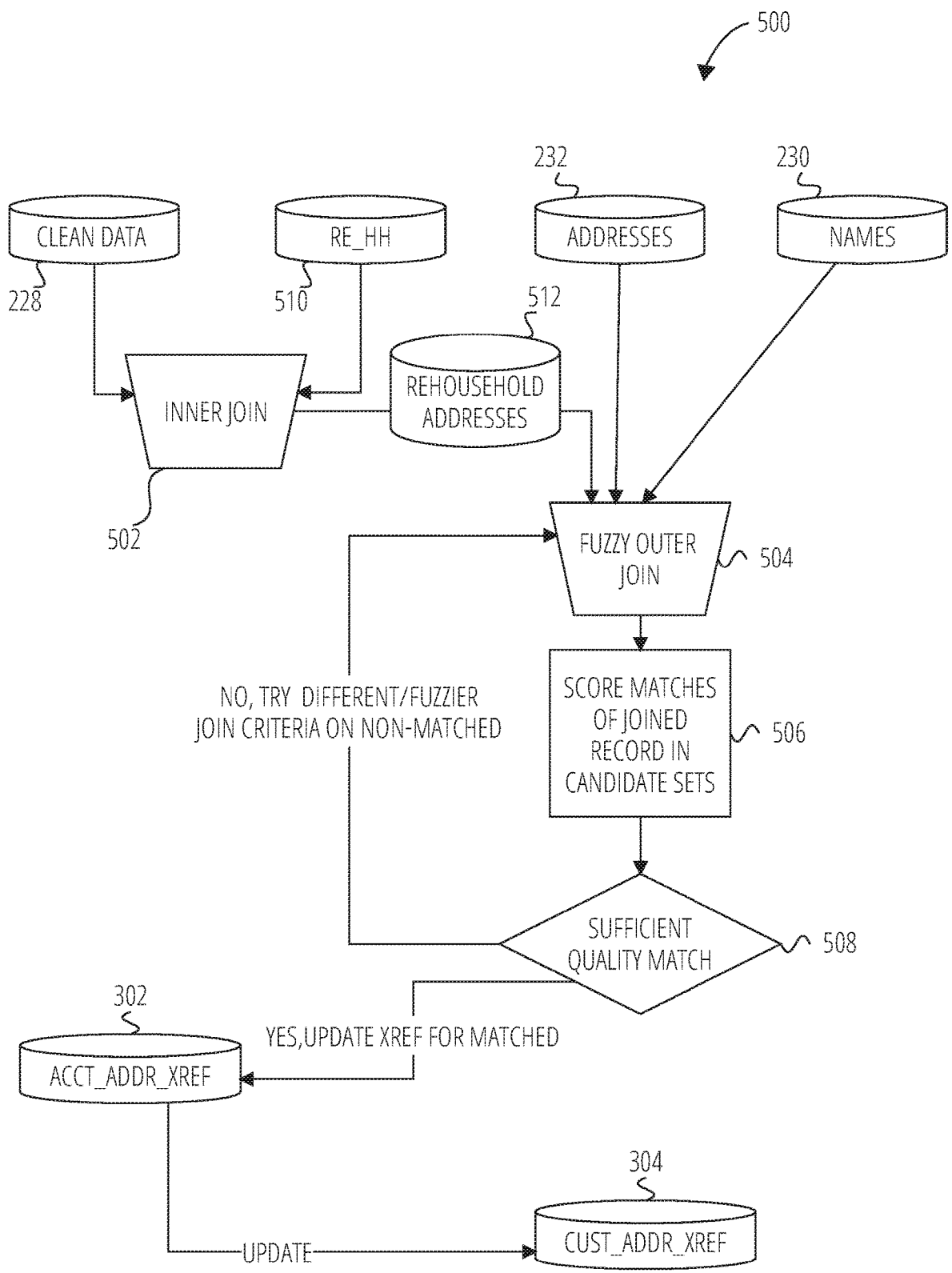
FIG. 5 is a flowchart illustrating operations of a method of rehouseholding for a set of addresses.

The remaining operations in method 200 are discussed in more detail with respect to FIG. 3, FIG. 4A, and FIG. 5. For example, synchronize tables operation 220 in which ADDRESSES table 232 and ADDR XREF table 234 are updated and synchronized is discussed in more detail with respect to FIG. 4A. Flag records for re-householding operation 222, re-household decision 224, and household process 226 are discussed in more detail with respect to FIG. 5.

FIG. 3 illustrates database table schemas, according to various examples. The names and order of the columns in each database table schema are an example, and other names and orders may be used. Similarly, the tables may include additional columns or fewer columns than what is presented without departing from the scope of this disclosure.

Address table columns 306 identify columns that may be in ADDRESSES table 232. The addresses in ADDRESSES table 232 may include all the addresses that have come into application server 102 (e.g., have been inserted using insert operation block 212 in FIG. 2) with misspellings, variations of street names, etc. As indicated previously, ADDRESSES table 232 may include entries for all variations of an address. Accordingly, ADDR_SKEY 314 column may store an integer identifier for every unique address, including variations in spellings, LACSlink (discussed in more detail below), etc. GROUP_ADDR_SKEY 316 (group address surrogate key) may be the address surrogate key of the "best" address from a group of equivalent addresses (addresses having the same physical location despite different house numbers, street names, etc.). For example, there may be multiple variants of the spelling of a city, etc., but they all are the same city. Determining what is the "best" address is discussed with respect to FIG. 4A.

Additional address table columns 306 may include LATITUDE to n decimal places, LONGITUDE to n decimal places, and a LAT_LONG_QCD (latitude/longitude quality code). In various example, the LAT_LONG_QCD may have a requirement to a rating of the highest quality code (e.g., if the ratings are 1-3, a 3 may be required) and be based on a "roof top" value of a premises. The MULTI_UNIT column may indicate if the address is part of a multi-until dwelling such as high-rise apartment buildings, trailer parks, office buildings, multi-tenant housing, etc. If MULTI_UNIT column indicates the address is a multi-unit building, there may be a requirement that there is a listed value in a MULTI_UNIT_SPEC column (not illustrated in FIG. 3). If a MULTI_UNIT_SPEC is not present, an address may still be tied to a household, but may use other auxiliary database table join information such as from values in the names table columns 312 of NAMES table 230.

In various example, the DELIVERABLE column in address table columns 306 may indicate (e.g., using a Bool) if the address scoring (e.g., address scoring component 122) indicates that the address is valid (e.g., corresponds to actual address) and thus is able to have mail sent to it. If the multi-unit column indicates the address is part of a multi-unit, then the DELIVERABLE column may be True only if the MULT_UNIT_SPEC also has a value, in various examples.

There is also a set of match columns that may be used to determine for grouping addresses. For example, address table columns 306 includes MATCH_ZIP (e.g., the first 5 characters of US zip code, full postal code for foreign addresses), MATCH_UNIT_SPEC (e.g., standardized apartment/unit spec—APT 121 D becomes 121D, UNIT D 121 becomes 121D), MATCH_CITY (e.g., USPS preferred city name for this address variant), and MATCH_ADDR (e.g., USPS preferred street name for street addresses, otherwise PO BOX, etc. as available). There may also be additional columns (not illustrated in address table columns 306).

ACCT_ADDR_XREF 302 and CUST_ADDR_XREF 304 are tables that associate a household identifier with accounts and customers, respectively. For example, ACCT_ADDR_XREF 302 includes account address cross reference column 308 of ACCOUNT_SKEY 318 (account surrogate key), ADDR_SKEY 320 (address surrogate key), GROUP_ADDR_SKEY 322 (group address surrogate key), HH_ID 324 (household identifier), and HH_MBRSP_CODE 326 (e.g., household membership code which may correspond to the quality match score discussed with respect to FIG. 5).

A surrogate key may be a primary key of a database table. For example, there may be an account database where each account is uniquely identified by the account surrogate key. The account surrogate key may be an account number in some examples, but in other examples may be a random unique identifier. A customer surrogate key may be the primary key in a customer database table. Within FIG. 3, it may be observed that ADDR_SKEY 314 is linked to ADDR_ SKEY 320 and ADDR_SKEY 330. Similarly, GROUP_ADDR_SKEY 316 is linked to GROUP_ADDR_SKEY 322 and GROUP_ADDR_SKEY 332.

Using cross reference tables, such as ACCT_ADDR_XREF 302 and CUST_ADDR_XREF 304, results in faster querying and searching than requiring a search and data join operation of multiple database tables (e.g., ADDRESSES table 232, a customer database table, an account database table, a household identifier database table, etc.) every time a customer or account needs to have its household identifier updated or queried.

In various examples, ACCT_ADDR_XREF 302 is governed by a set of logic rules. For example, in ACCT_ADDR_XREF 302, each value of ACCOUNT_SKEY 318 may be unique per reporting period (e.g., monthly). As mentioned above, the value of ADDR_SKEY 320 may point back to ADDR_SKEY 314 in ADDRESSES table 232, and therefore the value is associated with a standardized (e.g., using data standardization component 120 of FIG. 1) address variant. GROUP_ADDR_SKEY 322 may identify the "best" address of a group of related addresses (as discussed in more detail with respect to FIG. 4A) and points back to GROUP_ADDR_SKEY 316. HH_ID 324 may be a household identifier associated with multiple accounts, but each account may only be in one household identifier. In various examples, a household identifier may have only one GROUP_ADDR_SKEY, but a household identifier may have multiple distinct ADDR_SKEYs.

CUST_ADDR_XREF 304 may also be governed by a set of logic rules. For example, within CUST_ADDR_XREF 304, CUSTOMER_SKEY 328 is not required to be unique per reporting period, as a customer may have multiple accounts and be associated with multiple household identifiers. ADDR_SKEY 330 may point back to ADDR_SKEY 314 in ADDRESSES table 232, and therefore the value may be associated with a standardized address variant. GROUP_ADDR_SKEY 332 may be point to the "best" address of a group of related addresses (as discussed in more detail with respect to FIG. 4A) and points back to GROUP_ADDR_SKEY 316. HH_ID 334 may be a household identifier associated with multiple customers in CUST_ADDR_XREF 304, but HH_ID 334 may only have one GROUP_ADDR_SKEY 332. An HH_ID 334 may also have multiple, distinct ADDR_SKEYs 330.

As indicated previously, executing operations on large datasets is resource intensive. Thus, one improvement of the system and methods described herein is a reduction in the number of addresses in ADDRESSES table 232 that are processed using re-householding process component 126, which may include multiple rounds of algorithmic fuzzy matching. To achieve this goal, a series of operational gates may be used to process the addresses using less computationally expensive means.

For example, one type of gate may be the initial check to determine if an address for an account that is processed by application server 102 is new or changed from the last time method 200 was executed (e.g., monthly), such as done in trigger block 202 of FIG. 2. Another gate may be used to filter groups of addresses that exactly match on a certain number of data fields. This gate is described in more detail with respect to FIG. 4A and FIG. 4B. Another way to think about the gates is that there is a "pool" of addresses that are being processed, and at each gate, addresses are removed from the pool.

Figure 4B:
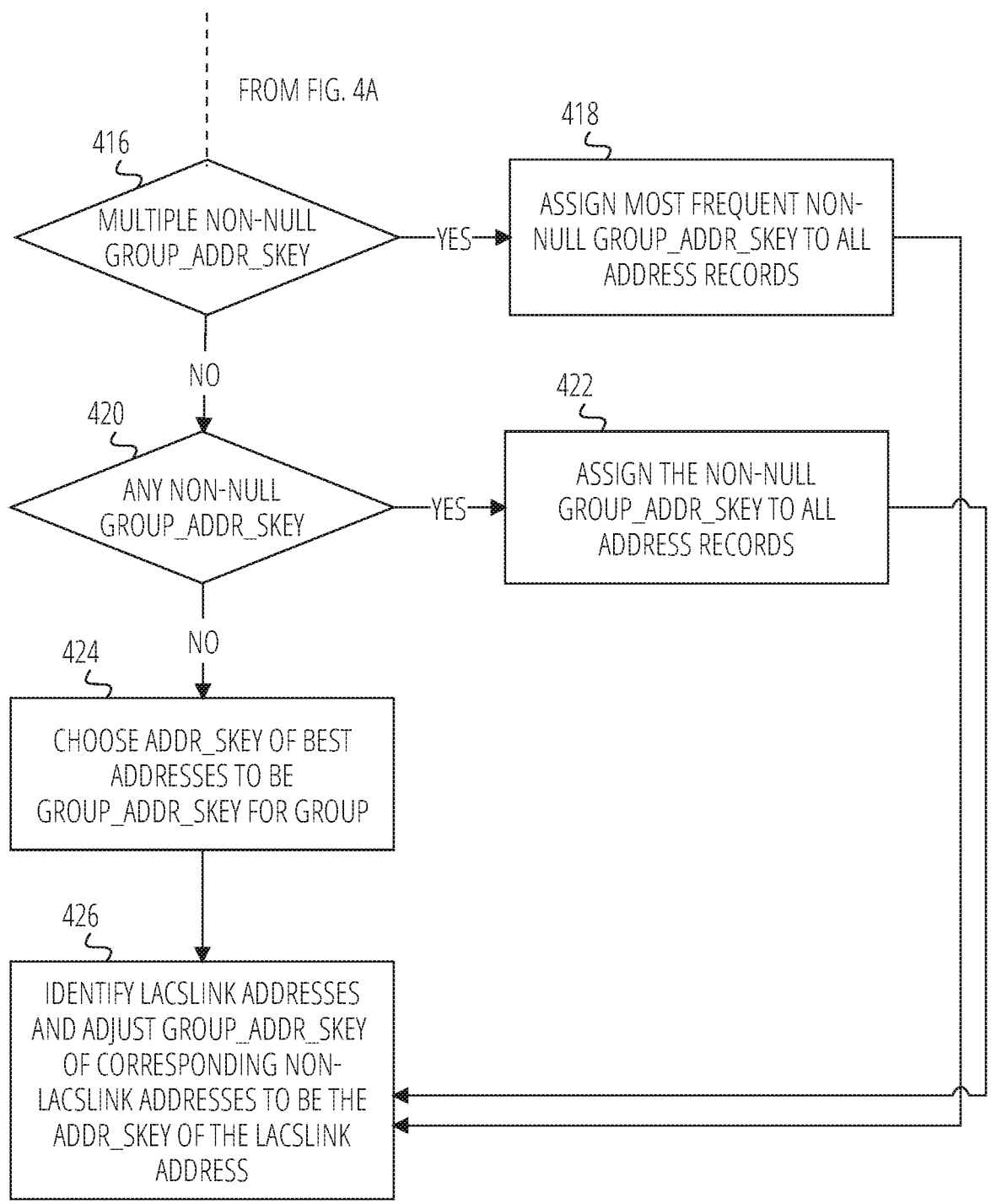
FIG. 4B is flowchart figure identifying operations of a method that groups addresses and assigns group address surrogate keys, according to various examples.

FIG. 4A and FIG. 4B are flowchart figures identifying operations of method 400 that group addresses and assign group address surrogate keys, according to various examples. The operations may be performed using element of application server 102 such as table update component 124. Additionally, the operations of method 400 may be performed in the context of synchronize tables operation 220 of ADDRESSES table 232 in FIG. 2. The operations may be performed using database commands such as SQL commands. For example, the SQL commands for group addresses operation 402 may be some version of "SELECT [column names], COUNT (*) FROM addresses GROUP BY [column names] HAVING COUNT (*)>1." As another example, an UPDATE SQL command may be executed when assigning group address surrogate key values to addresses in ADDRESSES table 232 or ADDR_XREF table 234.

At group addresses operation 402, the entries in ADDRESSES table 232 may be grouped according to a set of columns such as match zip code, match city, match address, match unit spec (e.g., apartment number), state code, and country code. If the values in the set of columns of a first entry do not completely match the values in the set of columns of a second entry, it is not considered a match. For example, if the first entry and second entry have the same match zip code, match city, match address, state code, and country code, but they do not have the same match unit spec, it is not a match—and therefore the first entry and second entry would not be grouped by group addresses operation 402.

Then, for each group resulting from group addresses operation 402, decision operation 404 may be performed. Decision operation 404 evaluates whether there are multiple non-null (e.g., non-empty) group address surrogate keys present in the group. For example, consider the scenario that there are three addresses in a group having address surrogate keys (e.g., ADDR_SKEY 314 column in FIG. 3) and group address surrogate keys (e.g., GROUP_ADDR_SKEY 316 column in FIG. 3) pairs of <1, >, <2, 2>, and <3, 2>. Accordingly, there are two addresses that have non-null group address surrogate key values.

Next, if decision operation 404 evaluates to true, the assign most frequent non-null group address surrogate key operation 406 may be performed. For example, continuing the scenario above, the address with an address surrogate key of '1' may have '2' assigned to its group address surrogate key in ADDRESSES table 232 and in ADDR_XREF table 234. If there is a tie for the most frequently occurring non-null group address surrogate key, the group address surrogate key of the address with the highest quality score may be used (e.g., as determined by address scoring component 122 of FIG. 1).

If decision operation 404 evaluates to false, decision operation 408 may be performed. At this operation, if there is at least one group address surrogate key present in the group then assign non-null group address surrogate key operation 410 is performed. For example, if the address surrogate key, group address surrogate key pairs were <1, >, <2, 2>, <3, > then '2' would be assigned as the group address surrogate key for each address in the group in ADDRESSES table 232 and ADDR XREF table 234.

If decision operation 408 evaluates to false, choose ADDR_SKEY operation 412 may be performed. At this operation, the address surrogate key of the address with the highest quality score (e.g., as determined by address scoring component 122) is assigned to each address in the group.

After group address surrogate keys have been assigned to addresses in the respective groups of group addresses operation 402, group high quality addresses operation 414 may be performed. In various examples, group high quality addresses operation 414 is performed on addresses were not assigned a group address surrogate key by assign most frequent non-null group address surrogate key operation 406, assign non-null group address surrogate key operation 410, or group high quality addresses operation 414. In other examples, group high quality addresses operation 414 is performed on all addresses regardless of if a group address surrogate key was assigned in a prior operation of method 400.

Group high quality addresses operation 414 may use a different set of columns to match on than group addresses operation 402. For example, the match columns may be match zip code, latitude, longitude, match unit spec, state code, and country code. The latitude and longitude values may correspond to the rooftop location of a physical premises. As with group addresses operation 402, an SQL command may be issued to determine the groups. Method 200 then continues to FIG. 4B.

FIG. 4B continues method 200 from group high quality addresses operation 414 at decision operation 416. Decision operation 416 may be performed in a similar fashion as decision operation 404. Thus, if there are multiple non-null group address surrogate keys in a group of addresses resulting from group high quality addresses operation 414, assign most frequent group address surrogate key operation 418 is performed for that respective group. Assign most frequent group address surrogate key operation 418 may be performed in a similar manner as assign most frequent non-null group address surrogate key operation 406, in various examples.

If decision operation 416 evaluates to false, method 200 may continue to decision operation 420. Decision operation 420 may be performed in a similar fashion as decision operation 408. Thus, if there is one group address surrogate key in a group of addresses from group high quality addresses operation 414, assign non-null group address surrogate key operation 422 is performed for that respective group. Assign non-null group address surrogate key operation 422 may be performed in a similar manner as 410 according to various examples.

If decision operation 420 evaluates to false, method 200 may continue to choose ADDR_SKEY operation 424. Choose ADDR_SKEY operation 424 may be performed in a similar manner as choose ADDR_SKEY operation 412, in various examples. Accordingly, the address surrogate key of the best address according to address scoring component 122 may be assigned as the group address surrogate key for each member of a group as determined by group high quality addresses operation 414.

LACSlink operation 426 may performed to determine if there are any (Locatable Address Conversion System Link) LACSlink addresses in a group as determined by group addresses operation 402 or group high quality addresses operation 414. A LACSlink address may be one in which the United States Postal Service has converted a rural style to city style address, when a street name is updated, or house/building numbers may be updated. LACSlink operation 426 may be performed by executing an API to an external data source (e.g., external data source 128) to identify any changes to addresses since the last time method 400 was performed. For addresses that have changed, the address surrogate key of the changed address may be assigned as the group address surrogate key for each member of the group.

FIG. 5 is a flowchart illustrating operations of method 500 that performs rehouseholding for a set of addresses. For example, method 500 may implement household process 226 with reference back to FIG. 2. As discussed previously, method 200 may have several gates to reduce the number of addresses that make it to household process 226. For example, trigger block 202 of FIG. 2. may be one gate and method 400 may include additional gates.

Again, with reference back to FIG. 2, flag records for re-householding operation 222 may be performed. This operation may compare the current value for the group address surrogate key (e.g., in addresses table 232) of an address to the prior value of the group address surrogate key for the address before method 200 was performed (e.g., has the group address surrogate key changed since a prior reporting period). If, at re-household decision 224, the value is different (or does not exist), the address surrogate key for the address may added to a rehouseholding table such as RE_HH table 510 in FIG. 5. If the value is the same, no further processing is needed on the address. For example, if there is an address that has not been seen before either because it is new or because it has misspellings, a different version of a city name, etc., the address may be added to RE_HH table 510.

Turning back to FIG. 5, method 500 may use data from CLEAN DATA table 228, ADDRESSES table 232, and NAMES table 230 from FIG. 2 and rehouseholding database table (RE_HH table 510) to match addresses identified in RE_HH table 510 to an address in ADDRESSES table 232. CLEAN DATA table 228 may be a standardized address database table that includes the standardized addresses and non-address fields resulting from standardize block 204 in FIG. 2. Inner join operation 502 may execute an inner join database table operation between RE_HH table 510 and CLEAN DATA table 228. The inner join may result in a temporary rehousehold address table (e.g., rehousehold addresses 512) with the standardized address and non-address information from CLEAN DATA table 228 related to the address identified in RE_HH table 510.

Rehousehold addresses 512 may be used an input to a fuzzy match search (e.g., fuzzy outer join operation 504) along with data from ADDRESSES table 232 and NAMES table 230. Because exact matching between addresses was completed using method 400, fuzzy matching may be used to find the remaining matches. Fuzzy matching may be a search technique that uses a variety of algorithms to match two addresses using partial matches. A partial match may be a match that matches on less than the complete set of columns used in group addresses operation 402 and group high quality addresses operation 414. A partial match may also be one in which a subset of characters match in a given column (e.g., the first three letters of the match city).

The resulting result table from fuzzy outer join operation 504 may be a table in which there are values from a first set of address columns in rehousehold addresses 512, values from a second set of address columns in ADDRESSES table 232, and values from non-address columns in NAMES table 230. For discussion purposes the values from rehousehold addresses 512 may be referred to as the rehousehold address values and the values from ADDRESSES table 232 and NAMES table 230 as existing household address values.

Household process 226 may have a stored set of fuzzy matching criteria for successive matching rounds of fuzzy outer join operation 504, score matches operation 506, and decision block 508. Each successive fuzzy matching criteria in the set may broaden (e.g., loosen) the matching criteria to include, and thereby increase, the pool of potential matches, but consequently also lower the accuracy of a match. In various examples, different columns may allow for different variations. For example, name, city, phone, TIN, and email may allow for typos and partial matches, whereas house number and house unit specification may require exact matches.

As an example, consider fuzzy matching criteria that matches (between a rehousehold address and an existing household address) on the first three numbers of the zip code, first two letters of the city, and the first letter of the street name field of the address. The number of characters matched may be identified as a proportional string length match requirement and be greater than a minimum length of a column value according to a schema. Because it is a fuzzy search using an outer join database table operation, the result is a many-to-many set of matches. Thus, an address in rehousehold addresses 512 may match to multiple addresses from ADDRESSES table 232. Conversely, an address in ADDRESSES table 232 may match to multiple addresses in rehousehold addresses 512.

Each entry resulting from fuzzy outer join operation 504 may have a score calculated according to stored criteria at score matches operations 506. For example, if the house number from in the rehousehold address exactly matches to the house number of the matched existing household address, the score may increase by one, if the street names match it may be worth a half of a point, and if the Taxpayer Identification Number (TIN) numbers match it may worth another point. The values of each type of match may be stored as part of the criteria.

At decision block 508 it may be determined if the score calculated for a match resulting from score matches operation 506 exceeds a quality match threshold value (e.g., six). For those address that do not meet the quality threshold value, flow may continue back to fuzzy outer join operation 504 with a new set of fuzzy matching criteria. For example, a match may be permitted if the match-unit specification does not match (e.g., is empty) but the phone number matches all number but one (e.g., 555-123-4567 vs 555-122-4567).

String similarity algorithms such as Levenshtein distance may be used as a type of fuzzy matching criteria. For example, a Levenshtein distance of up to one may be permitted for a phone number and three for city names. Other similarity algorithms employing n-grams or phonetic encodings such as Soundex, Metaphone, NYSIIS (New York State Identification and Intelligence Systems) or others may be used as well for the names, cities, street names, etc., without departing from the scope of this disclosure. As with the prior example matching criteria, the partial matches may be given a score as well. Consequently, while not as robust as an exact match, a sufficient quality score may be achieved if enough partial matches are made between a rehousehold address and an existing address.

Once a rehousehold address has matched to an existing household address and exceeds the match quality threshold value, ACCT_ADDR_XREF 302 may be updated for the rehousehold address. For example, with reference back to FIG. 3, the household identifier value (HH_ID 324) may be updated for the entry in an account cross-reference database table (e.g., ACCT_ADDR_XREF 302) that has the account identifier (as identified by ACCOUNT_SKEY 318) and address (as identified by ADDR_SKEY 320) associated with the rehousehold address. The household identifier may be set to the same household identifier as the value of the household identifier for the existing household address entry in ACCT_ADDR_XREF 302.

In addition to the household identifier, household membership quality code (HH_MBRSP_CODE 326) may be updated. HH_MBRSP_CODE 326 may be a household membership code that identifies the relative quality or confidence level of the household identifier. For example, the best quality may be given a value of one with higher numbers indicating lower, increasingly fuzzy matches. The HH_MBRSP_CODE 326 may be assigned based on a match type as stored in re-householding process component 126.

For example, a value of three may be assigned to as the HH_MBRSP_CODE 326 of the rehousehold address when the rehousehold address matches using the first three digits of the zip code, the social security number, the phone number, and the same address surrogate key. A higher code may be used, such as five when the match is based on the first three digits of the zip code and two successful (e.g., above a confidence threshold) SoundEx based comparisons of data fields, such as last name and street name.

The HH_MBRSP_CODE 326 may also be used when an initial household identifier is assigned if no match can be made to an existing address. For example, if no match can made that meets the scoring criteria of decision block 508, a new household identifier may be assigned to the rehousehold address. A value of 20, for example, may be assigned if the address is of low quality, but distinct, and there is a non-empty SSN and phone number.

In addition to updating ACCT_ADDR_XREF 302, method 500 may include updating CUST_ADDR_XREF 304. For example, the HH_ID 324 used in ACCT_ADDR_XREF 302 may also be assigned to the HH_ID 334 in CUST_ADDR_XREF 304.

Figure 6:
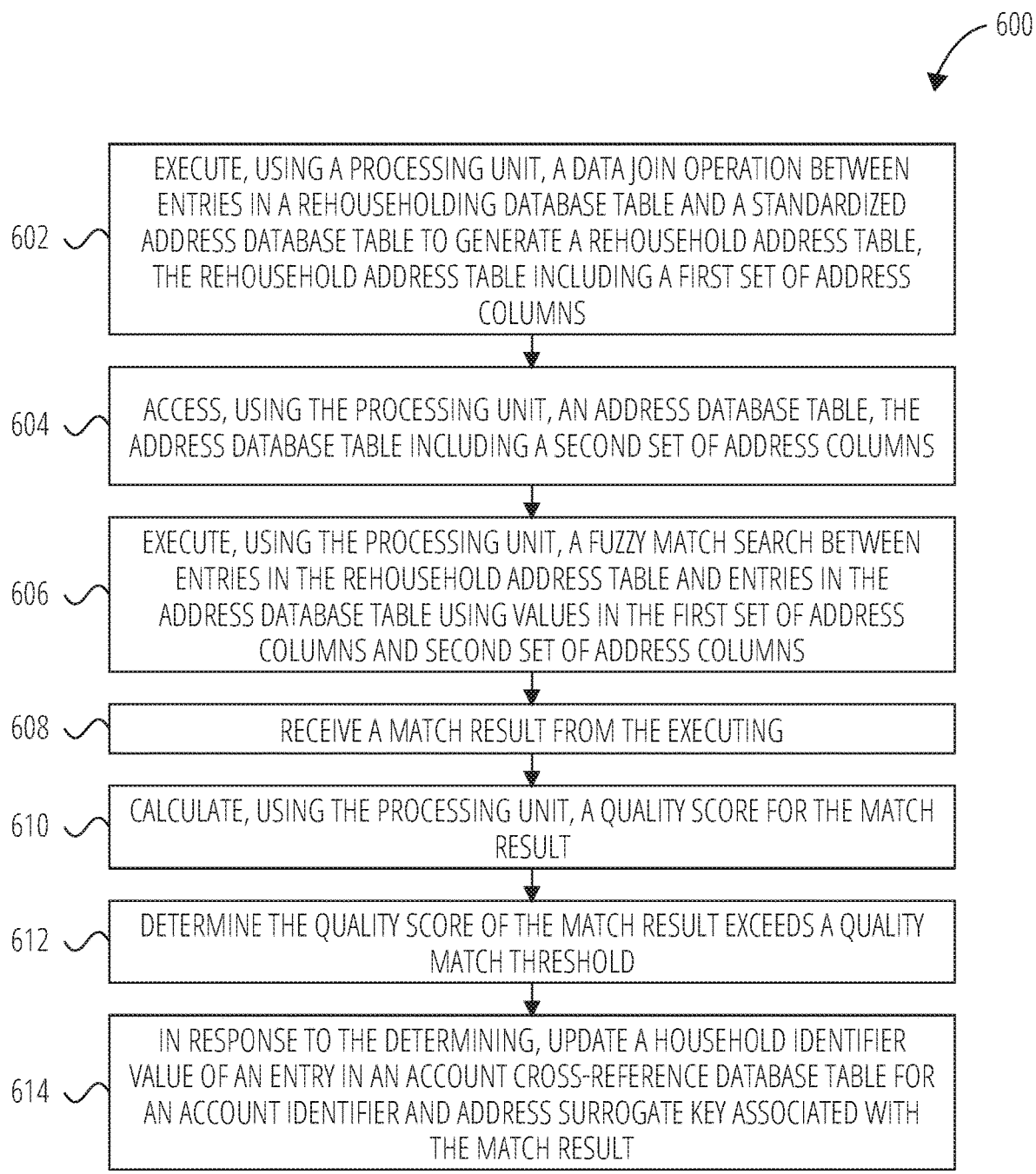
FIG. 6 is a flowchart illustrating operation of a method of assigning household identifiers, according to various examples.

FIG. 6 is a flowchart illustrating operations of a method of assigning household identifiers, according to various examples. The method is represented as a set of blocks (602 to 614) that describe the method operations. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to execute the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In block 602, method 600 executes, using a processing unit, a data join operation between entries in a rehouseholding database table and a standardized address database table to generate a rehousehold address table, the rehousehold address table including a first set of address columns. For example block 602 may be an inner join such as inner join operation 502 described in FIG. 5.

In block 604, method 600 accesses, using the processing unit, an address database table, the address database table including a second set of address columns. For example, the address database table may be ADDRESSES table 232 as described previously.

In block 606, method 600 executes, using the processing unit, a fuzzy match search between entries in the rehousehold address table and entries in the address database table using values in the first set of address columns and second set of address columns. The fuzzy match search be one such as described with respect to fuzzy outer join operation 504 in FIG. 5.

For example, executing block 606 may include retrieving fuzzy matching criteria for the fuzzy match search from a stored set of fuzzy matching criteria. The fuzzy matching criteria may identify a type of address field and a proportional string length match requirement for the type of address field. The type of address field may be a street name field and the string length match requirement may be a match of greater than a minimum length of a street name field.

In various examples, prior to the executing in block 606, an update to an address data field of an account address associated with the account identifier may be received. For example, a customer may update their address. Method 600 may then update a group address surrogate key value in an entry of the address database table of the address. Based on the updating, method 600 may include determining (e.g., using a compare data value operation) that the group address surrogate key value has changed from a prior value of the group address surrogate key and based on the updating, add the account identifier to the rehouseholding database table.

In block 608, method 600 receives a match result from the executing. In block 610, method 600 calculates, using the processing unit, a quality score for the match result, and, for each match result, a quality score may be calculated. For example, the score may be calculated as described with respect to score matches operation 506. Using the example from block 606, the quality score calculation may include determining, for the match result, if a value of a street name field in the first set of address columns meets the string length match requirement of a street name field in the second set of address columns.

In block 612, method 600 determines the quality score of the match result exceeds a quality match threshold. For example, block 612 may executed in a manner such as described with respect to decision block 508 in FIG. 5.

In block 614, method 600 in response to the determining, updates a household identifier value of an entry in an account cross-reference database table for an account identifier and address surrogate key associated with the match result. The updating the household identifier may be performed as described with respect to the discussion of ACCT_ADDR_XREF 302 and CUST_ADDR_XREF 304 in FIG. 5 after decision block 508. For example, method 600 may further execute an operation of updating a household membership quality code of the entry in the account cross-reference database table based on a match type of the fuzzy match search.

After the updating of the household identifier value, method 600 may execute additional operations. For example an operation of removing an entry in the rehousehold address table associated with the match result may be executed. Subsequent to the removing, the method may include determining there is at least one entry remaining in the rehousehold address table. Upon such a determination, a second fuzzy match search using second fuzzy matching criteria between entries in the rehousehold address table and entries in the address database table using values in the first set of address columns and second set of address columns may be executed.

Figure 7:
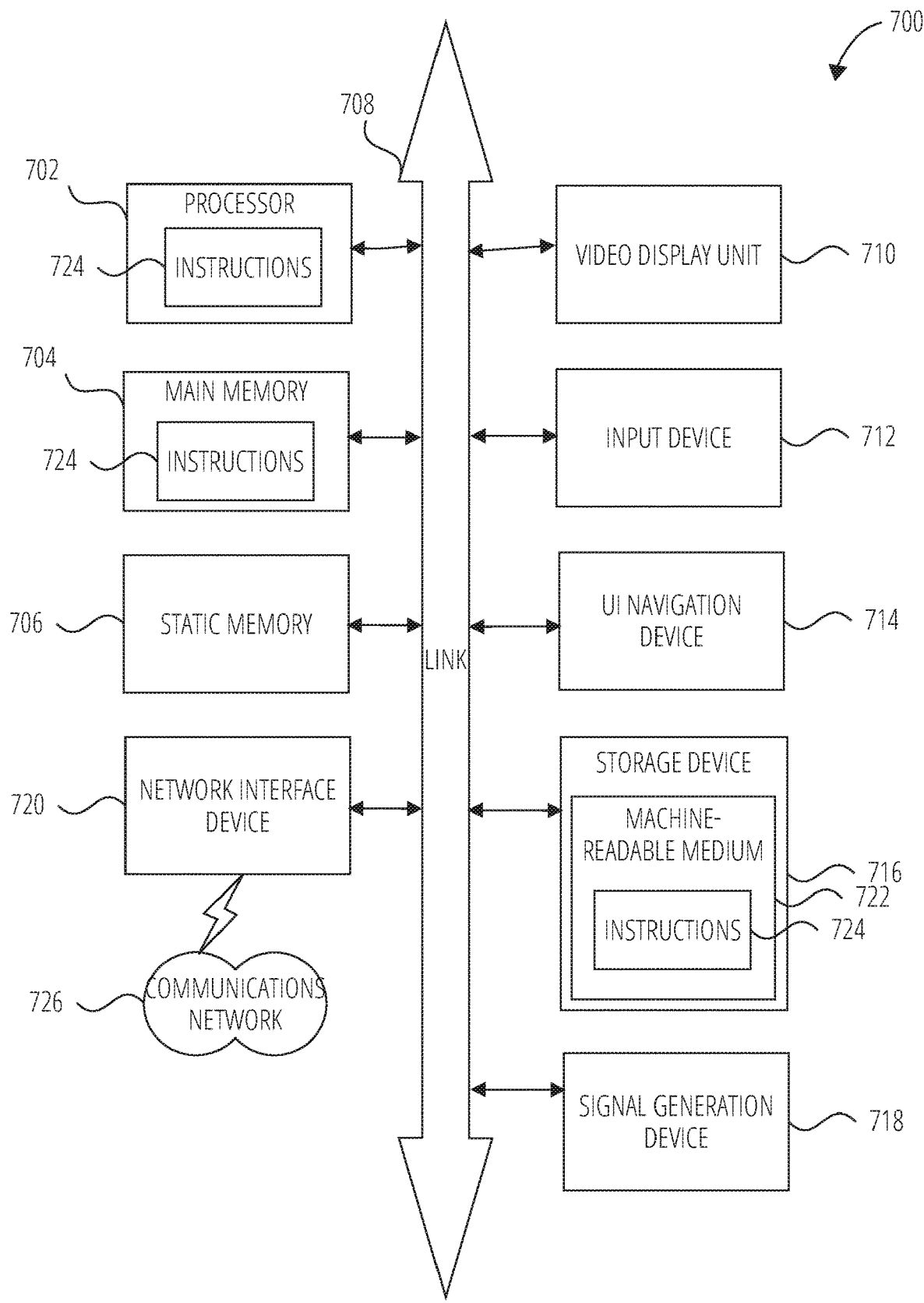
FIG. 7 is a block diagram illustrating a machine in the example form of computer system 700, within which a set or sequence of instructions may be executed to cause the machine to perform any one of the methodologies discussed herein, according to various examples.

FIG. 7 is a block diagram illustrating a machine in the example form of computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU), tensor processing unit, processor cores, compute nodes, or combinations thereof, etc.), a main memory 704 and a static memory 706, which communicate with each other via a link 708. The computer system 700 may further include a video display unit 710, an input device 712 (e.g., a keyboard), and a user interface UI navigation device 714 (e.g., a mouse). In one embodiment, the video display unit 710, input device 712, and UI navigation device 714 are incorporated into a single device housing such as a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensors.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed Database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 722 that excluded transitory signals.

The instructions 724 may further be transmitted or received over a communications network 726 using a transmission medium via the network interface device 720 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   executing, using a processing unit, a data join operation between entries in a rehouseholding database table and a standardized address database table to generate a rehousehold address table, the rehousehold address table including a first set of address columns;
   accessing, using the processing unit, an address database table, the address database table including a second set of address columns;
   executing, using the processing unit, a fuzzy match search between entries in the rehousehold address table and entries in the address database table using values in the first set of address columns and second set of address columns;
   receiving a match result from the executing;
   calculating, using the processing unit, a quality score for the match result;
   determining the quality score of the match result exceeds a quality match threshold; and in response to the determining, updating a household identifier value of an entry in an account cross-reference database table for an account identifier and address surrogate key associated with the match result.

2. The method of claim 1, further comprising, prior to the executing of the data join operation:
receiving, using the processing unit, an update to an address data field of an account address, the address associated with the account identifier;
updating, using the processing unit, a group address surrogate key value in an entry of the address database table of the address;
based on the updating, determining that the group address surrogate key value has changed from a prior value of the group address surrogate key; and
based on the updating, adding the account identifier to the rehouseholding database table.

3. The method of claim 1, wherein executing the fuzzy match search between entries in the rehousehold address table and entries in the address database table includes:
retrieving fuzzy matching criteria for the fuzzy match search from a stored set of fuzzy matching criteria, the fuzzy matching criteria identifying a type of address field and a string length match requirement for the type of address field.

4. The method of claim 3, wherein the type of address field is a street name field, and the string length match requirement is greater than a minimum length of a street name field.

5. The method of claim 4, wherein calculating, using the processing unit, the quality score for the match result includes:
determining, for the match result, if a value of a street name field in the first set of address columns meets the string length match requirement of a street name field in the second set of address columns.

6. The method of claim 1 further comprising:
subsequent to updating the household identifier value:
removing an entry in the rehousehold address table associated with the match result;
subsequent to the removing, determining there is at least one entry remaining in the rehousehold address table, and in response:
executing, using the processing unit, a second fuzzy match search using second fuzzy matching criteria between entries in the rehousehold address table and entries in the address database table using values in the first set of address columns and second set of address columns.

7. The method of claim 1, further comprising:
updating a household membership quality code of the entry in the account cross-reference database table, the household membership quality code based on a match type of the fuzzy match search.

8. The method of claim 1, wherein the data join operation is an inner join database table operation.

9. The method of claim 1, wherein the fuzzy match search is an outer join database table operation.

10. A non-transitory computer-readable storage medium comprising instructions, which when executed by a processing unit, configure the processing unit to perform operations comprising:
executing a data join operation between entries in a rehouseholding database table and a standardized address database table to generate a rehousehold address table, the rehousehold address table including a first set of address columns;
accessing an address database table, the address database table including a second set of address columns;
executing a fuzzy match search between entries in the rehousehold address table and entries in the address database table using values in the first set of address columns and second set of address columns;
receiving a match result from the executing;
calculating a quality score for the match result;
determining the quality score of the match result exceeds a quality match threshold; and
in response to the determining, updating a household identifier value of an entry in an account cross-reference database table for an account identifier and address surrogate key associated with the match result.

11. The non-transitory computer-readable storage medium of claim 10, wherein the instructions, which when executed by the processing unit, further configure the processing unit to perform operations, prior to the executing of the data join operation, comprising:
receiving an update to an address data field of an account address, the address associated with the account identifier;
updating a group address surrogate key value in an entry of the address database table of the address;
based on the updating, determining that the group address surrogate key value has changed from a prior value of the group address surrogate key; and
based on the updating, adding the account identifier to the rehouseholding database table.

12. The non-transitory computer-readable storage medium of claim 10, wherein executing the fuzzy match search between entries in the rehousehold address table and entries in the address database table includes:
retrieving fuzzy matching criteria for the fuzzy match search from a stored set of fuzzy matching criteria, the fuzzy matching criteria identifying a type of address field and a string length match requirement for the type of address field.

13. The non-transitory computer-readable storage medium of claim 12, wherein the type of address field is a street name field, and the string length match requirement is greater than a minimum length of a street name field.

14. The non-transitory computer-readable storage medium of claim 13, wherein calculating the quality score for the match result includes:
determining, for the match result, if a value of a street name field in the first set of address columns meets the string length match requirement of a street name field in the second set of address columns.

15. The non-transitory computer-readable storage medium of claim 10, wherein the instructions, which when executed by the processing unit, further configure the processing unit to perform operations comprising:
subsequent to updating the household identifier value:
removing an entry in the rehousehold address table associated with the match result;
subsequent to the removing, determining there is at least one entry remaining in the rehousehold address table, and in response:
executing a second fuzzy match search using second fuzzy matching criteria between entries in the rehousehold address table and entries in the address database table using values in the first set of address columns and second set of address columns.

16. The non-transitory computer-readable storage medium of claim 10, wherein the instructions, which when executed by the processing unit, further configure the processing unit to perform operations comprising:

updating a household membership quality code of the entry in the account cross-reference database table, the household membership quality code based on a match type of the fuzzy match search.

17. The non-transitory computer-readable storage medium of claim 10, wherein the data join operation is an inner join database table operation.

18. The non-transitory computer-readable storage medium of claim 10, wherein the fuzzy match search is an outer join database table operation.

19. A system comprising:
a processing unit;
a storage device comprising instructions, which when executed by the processing unit, configure the processing unit to perform operations comprising:
  executing a data join operation between entries in a rehouseholding database table and a standardized address database table to generate a rehousehold address table, the rehousehold address table including a first set of address columns;
  accessing an address database table, the address database table including a second set of address columns;
  executing a fuzzy match search between entries in the rehousehold address table and entries in the address database table using values in the first set of address columns and second set of address columns;
  receiving a match result from the executing;
  calculating a quality score for the match result;
  determining the quality score of the match result exceeds a quality match threshold; and
  in response to the determining, updating a household identifier value of an entry in an account cross-reference database table for an account identifier and address surrogate key associated with the match result.

20. The system of claim 19, wherein the instructions, which when executed by the processing unit, further configure the processing unit to perform operations, prior to the executing of the data join operation, comprising:
  receiving an update to an address data field of an account address, the address associated with the account identifier;
  updating a group address surrogate key value in an entry of the address database table of the address;
  based on the updating, determining that the group address surrogate key value has changed from a prior value of the group address surrogate key; and
  based on the updating, adding the account identifier to the rehouseholding database table.

* * * * *